No. 813,010. PATENTED FEB. 20, 1906.
J. W. LANGFITT.
ROAD GRADER.
APPLICATION FILED NOV. 6, 1905.
2 SHEETS—SHEET 2.
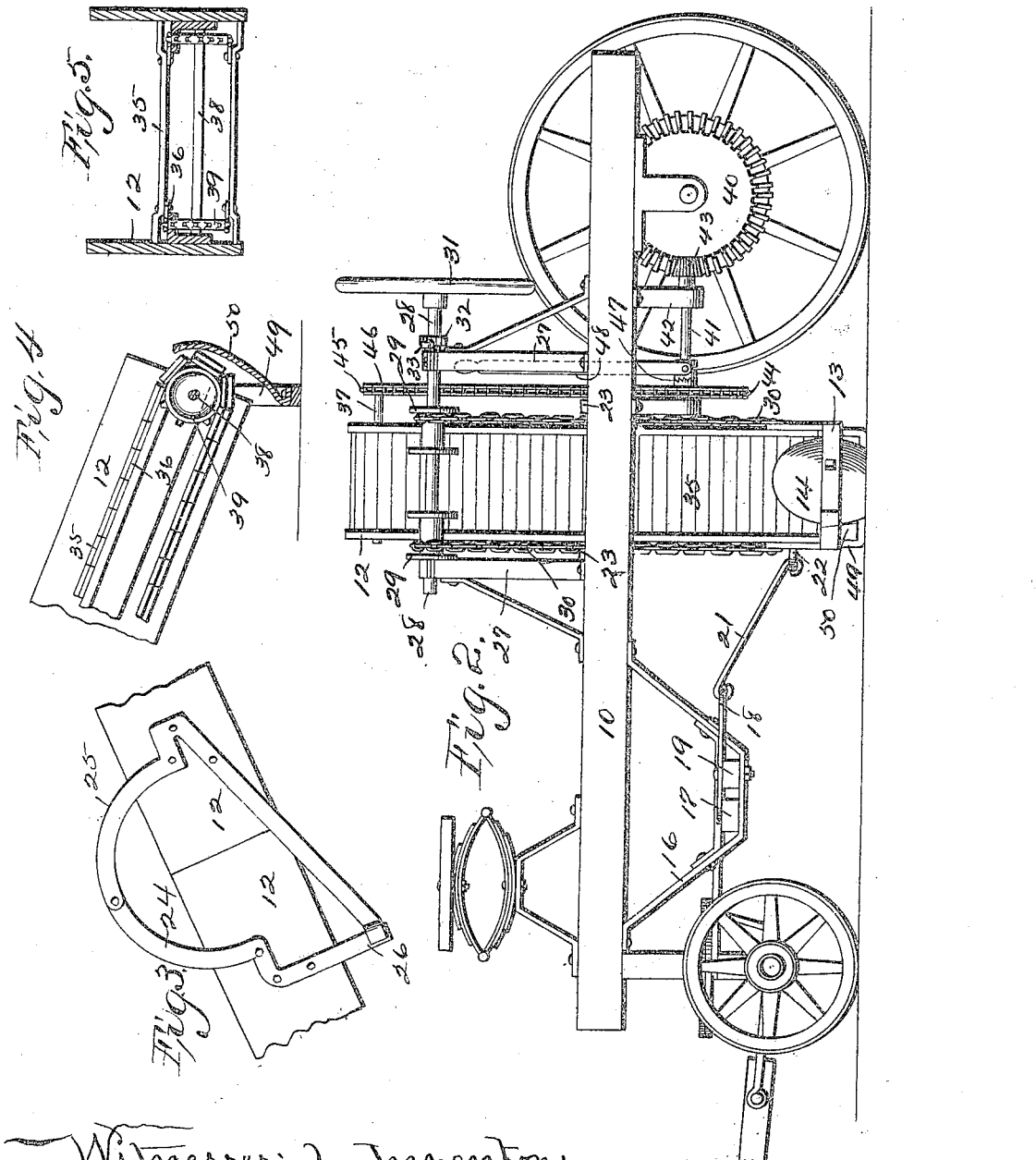

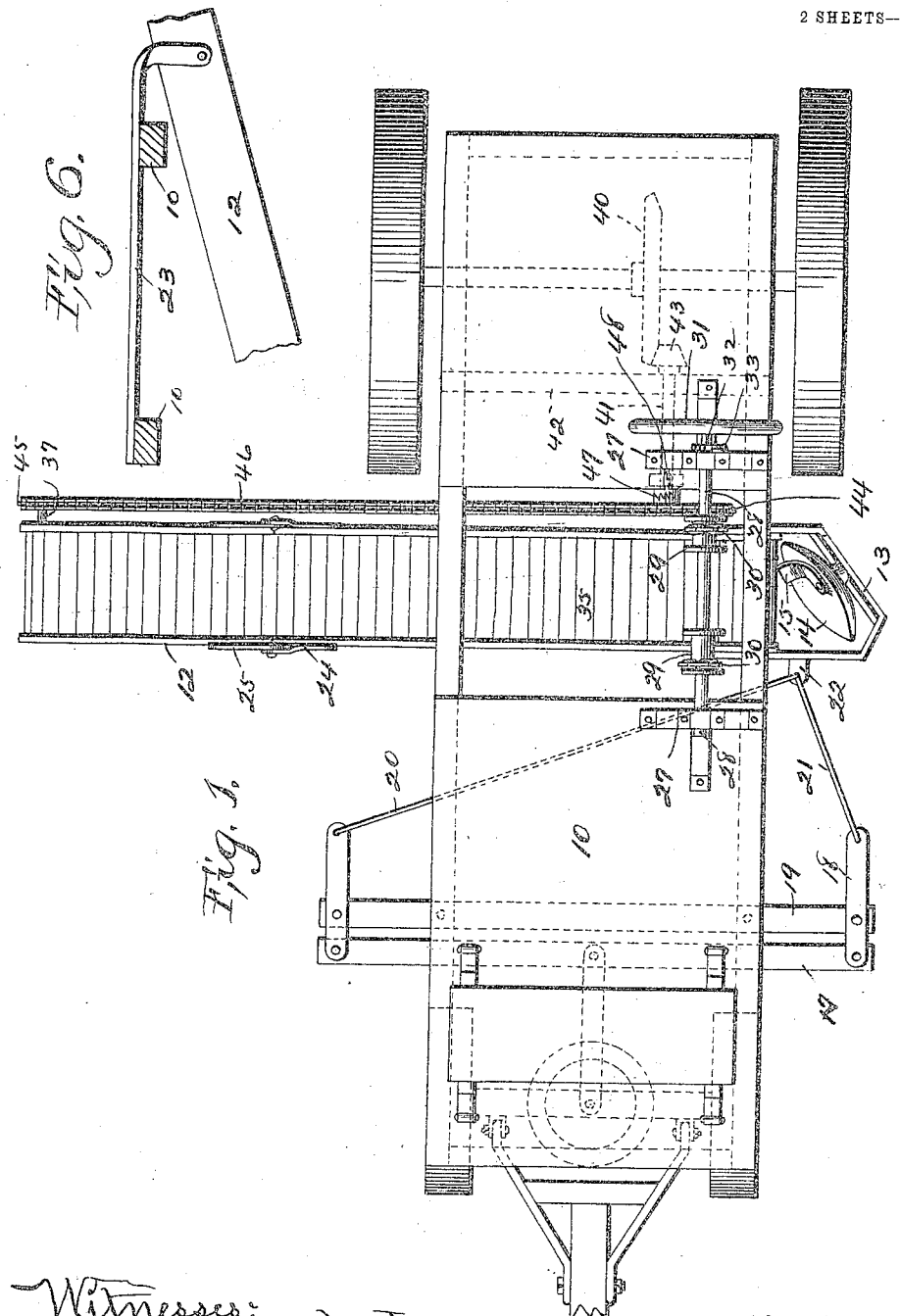

UNITED STATES PATENT OFFICE.

JOHN W. LANGFITT, OF ADEL, IOWA.

ROAD-GRADER.

No. 813,010.  Specification of Letters Patent.  Patented Feb. 20, 1906.

Application filed November 6, 1905. Serial No. 286,126.

*To all whom it may concern:*

Be it known that I, JOHN W. LANGFITT, a citizen of the United States, residing at Adel, in the county of Dallas and State of Iowa, have invented a new and useful Improvement in Road-Graders, of which the following is a specification.

My invention relates to the road-grader for which United States Letters Patent No. 800,220 were granted to me September 26, 1905; and my object is, first, to combine a wheel colter-plow direct with an endless carrier to cut ground loose and direct it upon the elevator; second, to flexibly connect the carrier-frame with the carriage-frame so the carrier-frame can move up and down relative to the carriage-frame and the ground when the machine is in operation; third, to provide a joint in the upper end portion of the elevator-frame to allow its upper end to be folded inward and downward to facilitate carrying it and moving the machine through gateways; fourth, to provide means for operating the carrier as required to elevate ground cut loose by the colter-plow carried by the elevator-frame; fifth, to provide means for carrying the elevator-frame elevated and the colter-plow inoperative; sixth, to combine a scraper with the colter-plow to serve as a moldboard for throwing loose ground from the plow and upon the elevator; seventh, to combine metal cross-slats and chain-links to produce an endless carrier adapted to coöperate with the colter-plow in the elevator-frame.

My invention consists in the construction, arrangement, and combination of elements and subcombinations, as hereinafter set forth, pointed out in my claims, and illustrated by the accompanying drawings, in which—

Figure 1 is a plan view that shows the positions of all the operative parts relative to each other and the carriage-frame. Fig. 2 is a side elevation of the machine and shows one of the rear carriage-wheels removed. Fig. 3 shows the construction of the joint in the upper portion of the carrier-frame. Fig. 4 is a detail view that shows the construction of the endless carrier and the manner of combining it with the lower end of the carrier-frame and a fender to prevent ground from passing through between the cross-slats of the endless carrier. Fig. 5 is a transverse sectional view of the carrier-frame and endless carrier combined therewith. Fig. 6 shows how the upper end portion of the carrier-frame is connected with the carriage-frame.

The numeral 10 designates a carriage-frame mounted upon four carriage-wheels.

The carrier-frame 12 is composed of two parallel sides rigidly connected. An auxiliary frame in which the rear side is shorter than the front side is connected, as shown in Fig. 1, to serve as an elbow-shaped bearer 13, adapted to support a rotatable colter-plow 14 in an inclined position relative to the carrier-frame in such a manner that when the machine is in operation it will cut ground loose and direct it toward the endless carrier in the carrier-frame.

The colter-plow is a concavo-convex disk journaled to the bearer 13, and a scraper 15 is fixed on the end of the journal in any suitable way, so that it will be retained stationary when the colter-plow rotates.

Frames 16 are fixed to the front portions and under sides of the parallel sides of the carriage-frame to support a cross-bar 17, fixed thereto. Levers 18 are pivoted to the ends of the cross-bar and pivotally connected by a cross-bar 19, and the free ends of the levers are pivotally connected with the front and lower portion of the carrier-frame by means of rods 20 and 21 and a lug 22, projecting from the carrier-frame, as shown in Fig. 1, or in any suitable way, in such a manner that the lower end of the carrier-frame will be self-adjusting when the colter-plow 14 is in operation, as required in cutting different kinds of ground and in passing obstructions and also as required for elevating the carrier-frame 12 to carry the colter-plow inoperative.

To support the adjustable carrier-frame in an inclined position, a frame 23 is fixed to the carriage-frame 10, as shown in Fig. 6, or in any suitable manner that will allow adjustment of the carrier-frame relative to the carriage-frame and the ground.

The upper end portion of the carrier-frame is jointed at its top, and the two parts are connected by hinge-irons 24 and 25 of peculiar form, fixed to the sides of the carrier-frame, as shown in Fig. 3. The irons 24 extend downward to serve as stops 26, and the irons 25 extend toward the stops and are bifurcated at their ends to engage the stops, as shown in Fig. 3, as required, to serve as braces to support the upper end portion of the frame when it is in alinement with the lower portion, as shown in Fig. 1.

Uprights 27 are fixed on top of one of the sides of the carriage-frame and braced, as shown in Fig. 2, to support a rotatable shaft 28. Drums 29 are fixed to the shaft and chains 30 to the drums and the chains connected with the lower portion of the carrier-frame in such a manner that by rotating the shaft by means of a hand-wheel 31 on its end the carrier-frame and colter-frame can be readily lifted and retained elevated by locking the shaft by means of a ratchet-wheel 32 on the shaft and a pawl 33, pivoted to an upright 27.

To the inside faces of the parallel sides of the carrier-frame 12 are fixed angle-irons 24, to serve as tracks to support an endless carrier composed of metal cross-slats 35, provided with double bends near their ends and chain-links 36, fixed thereto at said bends, as shown in Fig. 5.

Rotatable shafts 37 and 38 are mounted in the end portions of the carrier-frame 12 and spur-wheels 39 fixed thereto to engage the links 36.

To actuate the upper shaft 37, as required, to transmit motion therefrom to the endless carrier, a bevel gear-wheel 40 is fixed to the rear carriage-axle, and a rotatable shaft 41, suspended in bearers 42, fixed to the carriage-frame, is provided at its rear end with a pinion 43 to engage the wheel 40, and a sprocket-wheel 44, placed loose on its front end and connected with a sprocket-wheel 45 on the end of the shaft 37 by a chain 46 and a clutch 47 on the shaft 41, is provided with a lever 48 for operating the clutch as required for making the endless carrier operative and inoperative at pleasure.

A frame 49 is fixed to the lower end of the carrier-frame 12 and a fender 50, fixed thereto, as shown in Fig. 4 or in any suitable way, as required, to prevent ground from passing through between the carrier-slats 35 as they pass over the spur-wheels 39 and separate at their edges.

Having thus set forth the purposes of my invention and the construction and function of each element and subcombination and the arrangement and combination of all the parts, the practical operation and utility of the machine will be readily understood by persons familiar with the art to which it pertains.

What I claim as new, and desire to secure by Letters Patent, is—

1. In a road-grader, a carriage-frame, a carrier-frame flexibly and adjustably connected with the carriage-frame and a frame fixed to the lower end of the carrier-frame to support a colter-plow in the manner set forth.

2. In a road-grader, a carriage-frame, a carrier-frame composed of two parallel sides rigidly connected, an auxiliary frame fixed to its lower end and a colter-plow rotatably connected with the auxiliary frame, combined as set forth.

3. In a road-grader, a carriage-frame, a carrier-frame flexibly connected with the carriage-frame, to project upward laterally relative to the carriage-frame, and a rotatable plow carried at the lower end of the carrier-frame to operate as set forth.

4. In a road-grader, a carriage-frame, a carrier-frame extended upward and laterally at the central portion of the carriage-frame, a frame fixed to the lower end of the carrier-frame to support a colter-plow in an inclined position and means to flexibly connect the carrier-frame with the carriage-frame.

5. In a road-grader, a carriage-frame, a carrier-frame extended upward and laterally at the central portion of the carriage-frame, a frame fixed to the lower end of the carrier-frame and a colter-plow mounted therein and means to flexibly connect the lower end of the carrier-frame with the front portion of the carriage-frame.

6. In a road-grader, a carriage-frame, a carrier-frame extended upward and laterally at the central portion of the carriage-frame, a frame fixed to one of the sides of the carriage-frame, to support the carrier-frame and frames fixed to the front end portions of the parallel sides of the carriage-frame, a cross-bar fixed to said frames, levers pivoted to the ends of the cross-bar and pivotally connected by a rigid bar and the free ends of the levers pivotally connected with the lower end portion of the carrier-frame by rods as required to flexibly connect the lower end of the carrier-frame with the front portion of the carriage-frame.

7. In a road-grader, a carriage-frame, a carrier-frame extended upward and laterally at the central portion of the carriage-frame, a frame fixed to one of the sides of the carriage-frame, to support the carrier-frame and frames fixed to the front end portions of the parallel sides of the carriage-frame, a cross-bar fixed to said frames, levers pivoted to the ends of the cross-bars and pivotally connected by a rigid bar and the free ends of the levers pivotally connected with the lower end portion of the carrier-frame by rods as required to flexibly connect the lower end of the carrier-frame with the front portion of the carriage-frame, a plow on the lower end of the carrier-frame, an endless carrier-frame and means to raise and lower the carrier-frame.

8. In a road-grader, a carriage-frame, a carrier-frame extended upward and laterally at the central portion of the carriage-frame, a frame fixed to one of the sides of the carriage-frame to support the carrier-frame and frames fixed to the front end portions of the parallel sides of the carriage-frame, a cross-bar fixed to said frames, levers pivoted to the ends of the cross-bars and pivotally connected by a rigid bar and the free ends of the levers pivotally connected with the lower end portion of the carrier-frame by rods as required to flexibly connect the lower end of the carrier-frame with the front portion of the carriage-frame, a plow on the lower end of the carrier-frame, an endless carrier-frame and uprights fixed on top of the carriage-frame, a rotatable shaft mounted on the uprights, drums fixed on the shaft and chains fixed to the drums and to the lower portion of the carrier-frame.

9. In a road-grader, a carriage-frame, a carrier-frame extended upward and laterally at the central portion of the carriage-frame, a frame fixed to one of the sides of the carriage-frame to support the carrier-frame and frames fixed to the front end portions of the parallel sides of the carriage-frame, a cross-bar fixed to said frames, levers pivoted to the ends of the cross-bars and pivotally connected by a rigid bar and the free ends of the levers pivotally connected with the lower end of the carrier-frame by rods as required to flexibly connect the lower end of the carrier-frame with the front portion of the carriage-frame, a plow on the lower end of the carrier-frame, an endless carrier-frame and uprights fixed on top of the carriage-frame, a rotatable shaft mounted on the uprights, drums fixed on the shaft, chains fixed to the drums and to the lower end portion of the carrier-frame and means to rotate the shaft and also to retain it stationary.

10. In a road-grader, a carriage-frame, a carrier-frame extended upward and laterally at the central portion of the carriage-frame, a frame fixed to one of the sides of the carriage-frame to support the carrier-frame and frames fixed to the front end portions of the parallel sides of the carriage-frame, a cross-bar fixed to said frames, levers pivoted to the ends of the cross-bars and pivotally connected by a rigid bar and the free ends of the levers pivotally connected with the lower end of the carrier-frame by rods as required to flexibly connect the lower end portion of the carrier-frame with the front portion of the carriage-frame, a plow on the lower end of the carrier-frame, an endless carrier-frame, a rotatable shaft mounted on the uprights, drums fixed on the shaft, chains fixed to the drums and to the lower end portion of the carrier-frame means to rotate the shaft and also to retain it stationary and gearing connected with the carriage to actuate the endless carrier in the carrier-frame.

11. In a road-grader, a jointed carrier-frame, hinge members having stops extending downward and hinge members having braces extending toward the stops and bifurcated at their ends to engage the stops fixed to the sides of the frame, to operate as set forth.

12. In a road-grader, an elevator-frame flexibly connected with the carriage-frame, angle-irons fixed to the inside faces of the parallel sides, slats having double bends at their end portions, links fixed to the end portions of the slats, rotatable shafts in the ends of the frame and spur-wheels on the shafts to engage the links, to operate as set forth.

13. In a road-grader, an elevator-frame flexibly connected with the carriage-frame, angle-irons fixed to the inside faces of the parallel sides, slats having double bends at their end portions, links fixed to the end portions of the slats, rotatable shafts in the ends of the frame, spur-wheels on the shafts to engage the links and a fender fixed to the lower end of the frame, to operate as set forth.

14. In a road-grader, a frame for an endless carrier, an auxiliary frame fixed to the lower end of the carrier-frame, a concavo-convex rotary plow mounted in the auxiliary frame and a scraper fixed to the journal of the plow, to operate as set forth.

JOHN W. LANGFITT.

Witnesses:
G. W. CURTIS,
ELI McLANE.